United States Patent
Gammel et al.

(10) Patent No.: US 8,412,961 B2
(45) Date of Patent: Apr. 2, 2013

(54) CIRCUIT AND METHOD FOR DETECTING A LEGACY POWERED DEVICE IN A POWER OVER ETHERNET SYSTEM

(75) Inventors: John Christopher Gammel, Austin, TX (US); Endre Kovaks, Budapest (HU)

(73) Assignee: Silicon Laboratories Inc., Austin, TX (US)

( * ) Notice: Subject to any disclaimer, the term of this patent is extended or adjusted under 35 U.S.C. 154(b) by 403 days.

(21) Appl. No.: 12/762,184

(22) Filed: Apr. 16, 2010

(65) Prior Publication Data

US 2011/0258464 A1  Oct. 20, 2011

(51) Int. Cl.
*G06F 1/00* (2006.01)
*G06F 15/177* (2006.01)
*H04B 1/38* (2006.01)

(52) U.S. Cl. .................. 713/300; 709/220; 455/572
(58) Field of Classification Search ............. 713/300
See application file for complete search history.

(56) References Cited

U.S. PATENT DOCUMENTS

| | | | |
|---|---|---|---|
| 7,571,331 B2 | 8/2009 | Ohana et al. | |
| 7,593,756 B2* | 9/2009 | Ferentz et al. | 455/572 |
| 7,711,967 B2* | 5/2010 | Woo et al. | 713/300 |
| 7,856,561 B2* | 12/2010 | Stineman et al. | 713/300 |
| 7,936,546 B2* | 5/2011 | Vorenkamp et al. | 361/87 |
| 7,996,166 B2* | 8/2011 | de la Torre Vega et al. | 702/65 |
| 8,205,099 B2* | 6/2012 | Hussain et al. | 713/300 |
| 2004/0260794 A1* | 12/2004 | Ferentz et al. | 709/220 |
| 2006/0092000 A1* | 5/2006 | Karam et al. | 340/310.11 |
| 2006/0168458 A1 | 7/2006 | Stineman, Jr. et al. | |
| 2006/0212724 A1 | 9/2006 | Dwelley et al. | |
| 2006/0239183 A1 | 10/2006 | Robitaille et al. | |
| 2007/0165548 A1 | 7/2007 | Woo et al. | |
| 2007/0206774 A1 | 9/2007 | Vorenkamp et al. | |
| 2008/0244284 A1 | 10/2008 | Karam et al. | |
| 2009/0015237 A1 | 1/2009 | Vetteth | |

* cited by examiner

*Primary Examiner* — Suresh Suryawanshi

(74) *Attorney, Agent, or Firm* — Cesari & Reed LLP; R. Michael Reed

(57) ABSTRACT

In an embodiment, a power source equipment (PSE) device includes a network port configurable to couple to a network cable and a detection circuit coupled to the network port. The detection circuit is configured to apply a powered device (PD) detection voltage signal including first and second voltages to the network port and to sample a line current of the network port in response to the first and second voltages to detect a complex impedance indicating that a legacy PD is coupled to the network port.

20 Claims, 11 Drawing Sheets

CIRCUIT AND METHOD FOR DETECTING A LEGACY POWERED DEVICE IN A POWER OVER ETHERNET SYSTEM

FIELD

The present disclosure is generally related to a circuit and method for detecting a legacy powered device in a Power over Ethernet system.

BACKGROUND

The Institute of Electrical and Electronics Engineers (IEEE) has developed a standard for supplying power to an Ethernet device over Ethernet cabling. The standard is labeled "IEEE 802.3 clause 33" (hereinafter "the POE Standard"). The POE Standard defines a Power over Ethernet (POE) system as a system that delivers power over unshielded twisted-pair wiring from a Power Source Equipment (PSE) device to a Powered Device (PD) located at opposite sides of an Ethernet link. Such devices previously required two connections: a network cable connection and a power supply connection. However, the POE system provides a means for supplying power and data to a network device through the same Ethernet cable.

The term "PSE" refers to a device that applies power to the Ethernet cable, which may be used to deliver both power and data to a PD. A PSE device can be an Ethernet switch, router, other network switching equipment, or midspan device of a data communications network. The term "PD" refers to a device that is connected to the link and that is configured to draw power and/or request power from the PSE device through the link. PDs can include a wide variety of devices, including digital Internet Protocol (IP) telephones, wireless network access points, personal digital assistants (PDAs), notebook computer docking stations, cell phone chargers, Web cameras, process control devices, HVAC thermostats, and other electronic devices.

Conventionally, a PSE device may include a plurality of network ports, which are configurable to connect to multiple PDs and to other Ethernet devices that are not compatible with the POE Standard. Accordingly, the POE Standard specifies a POE Standard PD detection process that is executed by a PSE device to detect a PD connected to the network port. In particular, the PSE device applies a signal to the network port, and the PD participates in the detection procedure by presenting a PD signature defined by the POE Standard, namely a signature resistance in a range from 19 to 26.5 k$\Omega$. While the POE Standard specifies the electrical characteristics of the PD signature and defines limits on the voltage (between approximately 2.8V and 10V) and the current (less than approximately 5 mA) for use in the detection process, the POE Standard does not specify any particular technique for detecting the resistance.

One common technique for detecting the PD signature includes applying a small current to the network port, typically in a range of about 150 µA to 400 µA, and measuring a voltage at the network port. When the PSE device applies such a current to a network port connected to a PD that complies with the POE Standard, the measured voltage falls within the range of approximately 2.8V to 10V.

Another technique involves applying a voltage within the range of 2.8V to 10V to the network port, and measuring an associated line current. The applied voltage can be divided by the line current to detect the resistive PD signature.

However, some PDs, which were manufactured before the adoption of the POE Standard, do not provide the expected PD signature in response to the PSE's detection signal. Such PDs are referred to as legacy PDs. Many of these legacy PDs used entirely different methods of detection. In one instance, the receive (RX) pins of the legacy PD were connected to the transmit (TX) pins by a relay or other electronic circuit. The legacy PSE device would probe for such a legacy PD by sending a modified fast-link-pulse and monitoring the return signal. If the legacy PD was detected based on the return signal, the PSE would provide power via the Ethernet cable, causing the relay or other circuit to disconnected the RX and TX pins and allowing the Ethernet link to operate normally. However, since not all of the legacy PDs can support the modified fast-link-pulse PD detection, supporting fast-link-pulse PD detection alone may be insufficient to detect such legacy PDs.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

A system, PSE device and methods are described below that can be used to detect and optionally deliver power to POE Standard-compliant PDs as well as legacy PDs. Since not all legacy PDs can support modified fast-link-pulse PD detection, it is desirable to discover and power such legacy PDs by determining a detectable legacy PD signature that can be identified using the POE Standard PD detection process. In particular, the PSE device includes a PD detection circuit configured to detect a resistive-capacitive (RC) characteristic of the Ethernet device that indicates a legacy PD. Before the PSE device provides power to such a non-conforming legacy PD, the PSE device first issues a warning to a host system (or control circuit) to allow a system administrator or processing logic to verify that power should be provided by the PSE device to the device connected to the port.

Further, legacy PDs that support the modified fast-link-pulse PD detection process often exhibit a signature in response to a POE Standard detection process that resembles a capacitor and a resistor in parallel. Other legacy PDs may have a large capacitor and a series diode as their POE detection signature. Still other legacy PDs may use data loopback for the PD detection signature, which data loopback involves a relatively small capacitor between the wire pairs. While the POE Standard permits a capacitance of approximately 0.1 µF, such legacy PDs typically include capacitances larger than 0.1 µF by an order of magnitude. Accordingly, the PSE device described below utilizes a POE Standard PD detection process to detect legacy PDs based on the resistive-capacitive (RC) signature of the PD in response to an applied PD detection voltage signal.

Figure 1:
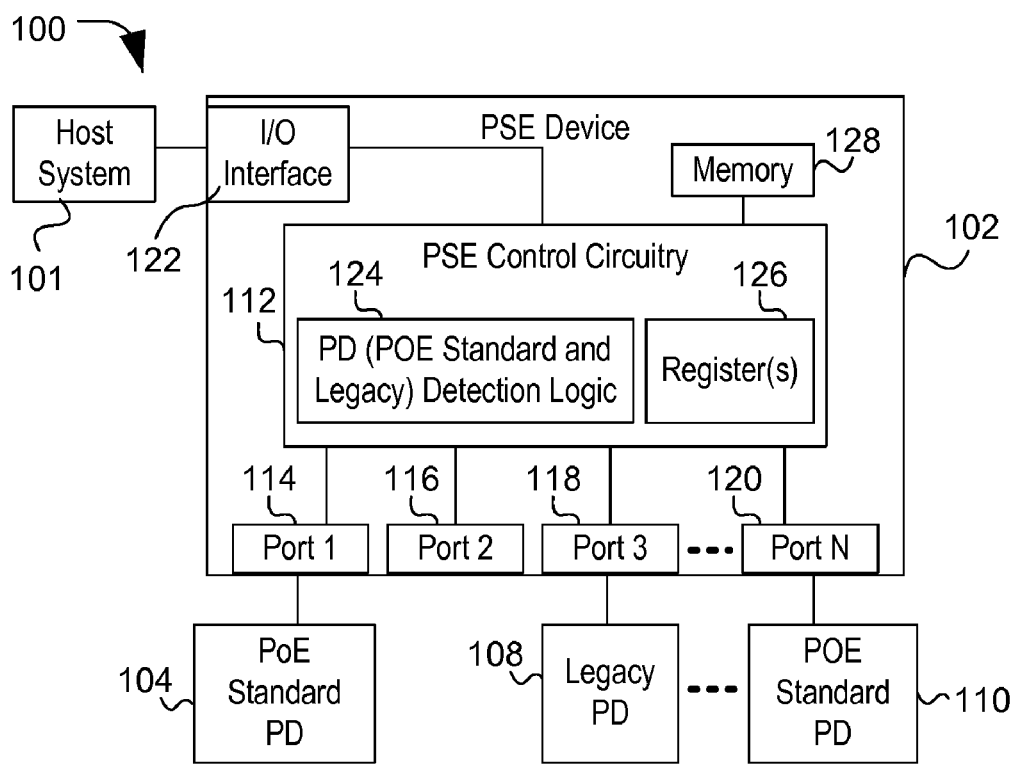
FIG. 1 is a block diagram of a Power over Ethernet (POE) system including a power source equipment (PSE) device for detecting a legacy power device (PD).

FIG. 1 is a block diagram of a Power over Ethernet (POE) system 100 including a PSE device 102 for detecting a legacy PD, such as legacy PD 108. POE system 100 includes a host system 101, such as a processor, control circuit, or other device configured to connect to PSE device 102 to define a plurality of parameters, such as thresholds and operating modes, and to control the operation of PSE device 102. Further, PSE device 102 is connected to POE Standard-compliant PDs 104 and 110 and to legacy PD 108 through Ethernet cables. As used herein, the term "POE Standard-compliant PD" or the term "PD" refers to a device configurable to receive power and data from an Ethernet cable and that responds to a POE Standard PD detection process by providing a device signature that reflects a resistance within a range of approximately 19 to 26.5 kΩ.

PSE device 102 includes an input/output (I/O) interface 122 connected to host system 101 and to PSE control circuitry 112. PSE control circuitry 112 is connected to multiple network ports, including a first port (Port 1) 114, a second port (Port 2) 116, a third port (Port 2) 118, and an n-th port (Port N) 120, each of which is configurable to connect to a device, which may be PD, a legacy PD, or another Ethernet device that is not designed to receive power through the network cable. PSE control circuitry 112 includes PD detection logic 124 adapted to detect POE Standard-compliant PDs, such as PDs 104 and 110, as well as legacy PDs, such as legacy PD 108. Additionally, PSE control circuitry 112 includes one or more registers 126 to store PD detection status bits for each of the plurality of ports 114, 116, 118, and 120. Further, PSE control circuitry 112 is connected to a memory 128, which may be used to store instructions executable by PSE control circuitry 112, data, and legacy PD threshold information.

During a PD detection process, PD detection logic 124 tests a selected network port by applying a PD detection voltage signal to the network port. In particular, PD detection logic 124 applies a PD detection voltage signal including multiple voltage levels, such as a first voltage level ($V_1$) of approximately four volts, a second voltage level ($V_2$) of approximately eight volts, and a third voltage level ($V_3$) of approximately four volts. Each of the voltage levels may be applied to a selected port, such as the third port (Port 3) 118, for a period of time. At the same time, PD detection logic 124 limits the line current to the selected port to a level that is less than or equal to approximately 3 mA. PD detection logic 124 measures the port voltage before and after each transition of the PD detection voltage signal, which should substantially match the applied PD detection voltage signal. Additionally, PD detection logic 124 samples the line current before and after each transition. PD detection logic detects valid PD by calculating a resistance according to the POE Standard, which calculation represented by Equation 1 below.

$$R = \frac{V_2 - V_1}{I_2 - I_1} \tag{1}$$

As previously mentioned, when the resistance (R) is between 19 kΩ and approximately 26.5 kΩ, a valid PD signature is detected. Further, PD detection logic 124 may detect various invalid device signatures, some of which may indicate that a legacy PD, such as legacy PD 108, is connected to one of the ports 114, 116, 118, and 120. Such invalid device signatures may represent a purely capacitive device, a purely resistive device, a short circuit, an open circuit, or a resistive-capacitive device, which has a device signature indicating a complex impedance. An open circuit or a purely capacitive device may be detected as very high impedances, which are much higher than 26 kΩ. A short circuit may be detected as a very low impedance, which is below 1 kΩ. A purely resistive device presents a resistive device signature that can be compared to a resistance range of 19 kΩ to 26 kΩ as defined by the POE Standard to determine whether the resistive signature indicates a valid signature for a POE Standard-compatible PD. PD detection logic 124 uses the third voltage level ($V_3$) to verify a detected valid signature by recalculating the resistance. If the calculated resistance continues to fall within a range of approximately 19 kΩ to approximately 26.5 kΩ, PSE control circuitry 112 determines that the signature is in the "good" range and that the PD is POE Standard-compliant.

If the resistance is outside of the accepted range, then a purely restive device is detected. PD detection logic 124 updates status bits within registers 126 when any of the above-conditions are detected. PSE control circuitry 112 may communicate such status bits to host system 101 through I/O interface 122.

Further, when a complex impedance (a Resistive-Capacitive characteristic) is detected, the resistance and timing information (such as current drop-off time or time constant information) associated with the complex impedance can be determined based on variations in the line current samples. In particular, the time constant can be calculated and the steady state current can be determined. The steady state current is the current level at which the line current settles after a capacitive portion of the load is charged. The time it takes to settle to the steady state current level can be used to determine the time constant.

The time constant, the steady state current, and/or an associated capacitance can be compared to threshold data in memory 128. PSE control circuitry 112 updates registers 126 with status bits indicating a legacy PD may be connected to the port, when the time constant and steady state current fall within a range associated with such legacy PDs. It should be understood that a POE Standard PD may have a capacitance of approximately 0.1 µF, which may be detected; however, the small capacitance can be disregarded or ignored by delaying the sampling of the line current until after the steady state current would be reached (if a similar voltage and current were applied to such a device). In a particular example, the line current is sampled approximately 2 ms after the voltage transition is applied within the PD detection voltage signal. Once a legacy PD is detected, PSE control circuitry 112 may communicate status bits to host system 101 through I/O interface 122 using an interrupt, for example, or by updating registers 126.

In some instances, PSE control circuitry 112 is configured to automatically proceed with a POE classification process to determine the power requirements of a PD that is POE Standard-compliant and apply power to the port. However, in other instances, PSE control circuitry 112 may simply update the registers 126 and wait for a control signal from host system 101 before applying power to the port.

With respect to legacy PDs, PSE control circuitry 112 is configured to supply power to the port in response to a control signal from host system 101. In particular, PSE control circuitry 112 is configured to detect devices connected to the ports, but to wait for instructions from the host system 101 before providing power to legacy PDs or other devices that do not satisfy the PD detection process as defined by the POE Standard. Host system 101 can be used to configure the voltage and current to be supplied to legacy device 108, or to provide a custom configuration for a particular legacy device.

PSE device 102 performs a variety of functions described in the POE Standard and/or the POE-Plus Standard, including PD detection, PD classification, over-voltage protection, and other functions. While the PSE device 102 of FIG. 1 depicted the PSE control circuit 112 as a single block, the PSE control circuit 112 includes a number of circuit components and provides robust PSE device functionality as discussed below with respect to FIG. 2.

Figure 2:
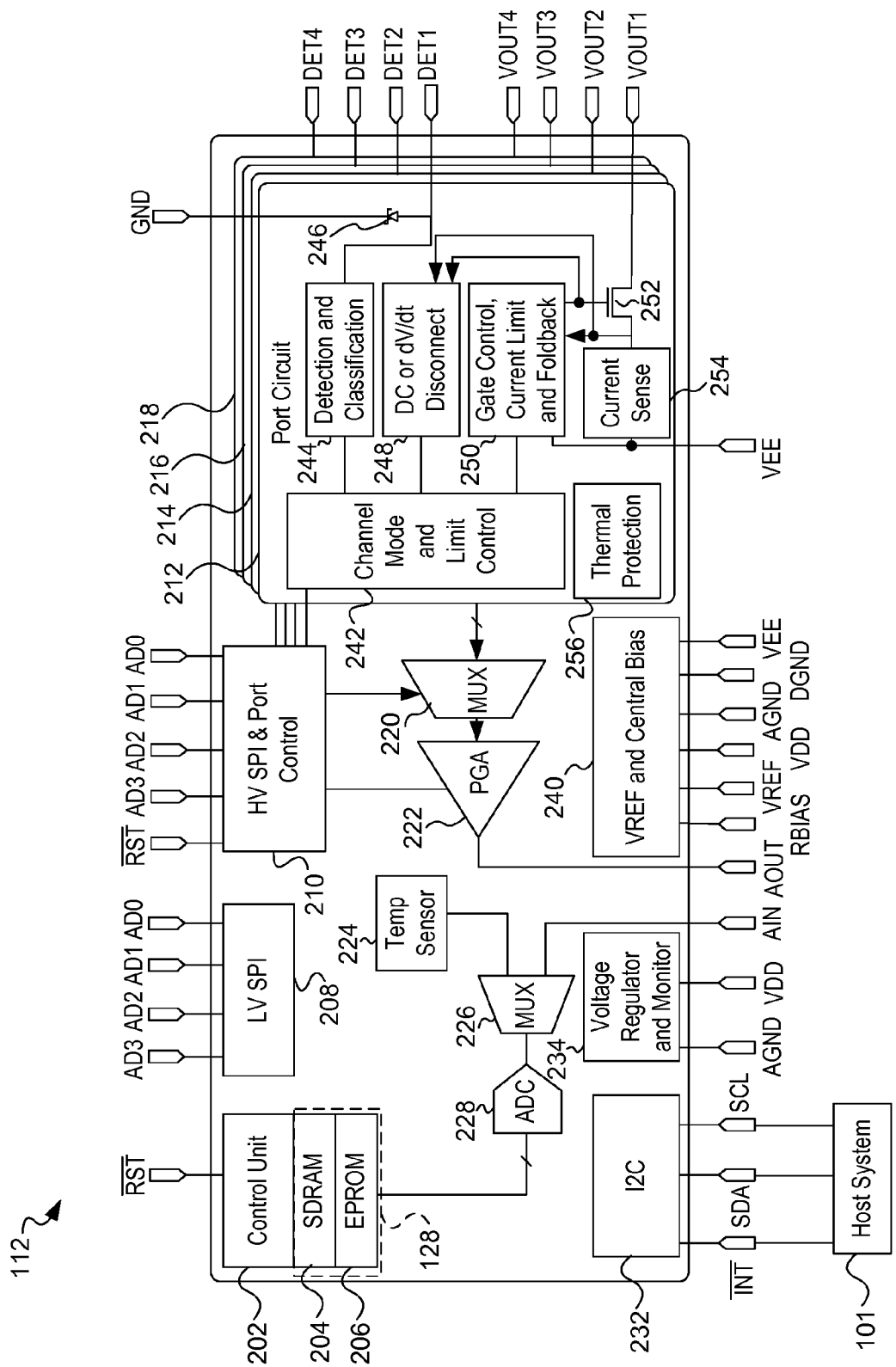
FIG. 2 is a block diagram of a PSE control circuit for use within a PSE device for detecting a legacy PD.

FIG. 2 is a block diagram of a PSE control circuit 112 for use within a PSE device, such as PSE device 102 depicted in FIG. 1, for detecting a legacy PD, such as legacy PD 106. PSE control circuit 112 includes a control unit 202, such as a microcontrol unit core and PSE finite state machine (FSM) and memory 128, including a synchronous dynamic random access memory (SDRAM) 204, and an erasable programmable read-only memory (EPROM) 206. Control unit 202 is connected to an inverted reset pin ($\overline{RST}$). Further, control unit 202 is connected to analog-to-digital converter (ADC) 228, which is connected to multiplexer (MUX) 226. MUX 226 includes a first input connected to a temperature sensor 224 and a second input connected to an analog input (AIN) pin.

PSE control circuit 112 further includes a low voltage (LV) serial peripheral interface (SPI) 208, which is connected to address pins (AD3, AD2, AD1, and AD0). Additionally, PSE control circuit 112 includes a high voltage (HV) SPI and port control circuit 210, which is connected to an inverted reset pin ($\overline{RST}$) and to address pins (AD3, AD2, AD1, and AD0). HV SPI and port control circuit 210 includes a plurality of inputs connected to a respective plurality of port circuits 212, 214, 216, and 218. HV SPI and port control circuit 210 is also connected to a select input of MUX 220 and to an input of a programmable gain amplifier (PGA) 222. MUX 220 includes a plurality of inputs connected to the respective plurality of port circuits 212, 214, 216, and 218 and an output connected to an input of PGA 222, which includes an output connected to an analog output (AOUT) pin.

PSE control circuit 112 an inter-integrated circuit (I²C®) interface 232, which is connected to host system 101 through an inverted interrupt ($\overline{INT}$) pin, a serial data (SDA) pin, and a serial clock (SCL) pin. PSE control circuit 112 also includes a voltage regulator and monitor circuit 234, which is connected to an analog ground (AGND) pin and to a positive power supply voltage (VDD) pin. The I²C® interface 232 is configured to connect directly to system host 101 or other controller to allow for design flexibility and reduced costs, eliminating the need for an external microcontrol unit. PSE control circuit 112 can be set to one of twelve unique addresses, allowing control of up to 48 ports through a single I²C® bus.

PSE control circuit 112 includes a voltage reference (VREF) and central bias circuit 240.

Port circuit 212 includes a channel mode and limit control 242, which is connected to detection and classification circuit 244, DC or dV/dt disconnect circuit 248, and gate control, current limit and foldback circuit 250. Detection and classification circuit 244 is connected to a first detection (DET1) pin and to a ground pin (GND) through zener diode 246. Gate control, current limit and foldback circuit 250 is connected to a control terminal of transistor 252, which has a first current electrode connected to a first voltage output (VOUT1) pin and a second current electrode connected to current sense circuitry 254 and to gate control, current limit and foldback circuit 250. Current sense circuitry 254 is connected to a negative supply voltage (VEE) pin, which is also connected to gate control, current limit and foldback circuit 250. The second current electrode and the control terminal of transistor 252 are both connected to DC or dV/dt disconnect circuit 248.

While the illustrated embodiment includes the current sense circuit 254 and transistor 252 within port circuit 212, in other embodiments, the current sense circuit 254 and/or transistor 252 may be external to port circuit 212. In such alternative embodiments, one or more additional pins may be provided for controlling transistor 252 and for sampling the current.

In general, each of the port circuits 212, 214, 216, and 218 includes and/or is coupled to similar circuitry. Each is connected to a respective one of the voltage output pins (VOUT1, VOUT2, VOUT 3, and VOUT4), to a respective one of the detection pins (DET1, DET2, DET3, and DET4), and to the negative supply voltage VEE, respectively. Further, port circuits 212 and 214 are connected to a shared ground. It should be understood that each network port (such as ports 114, 116, 118, and 120 depicted in FIG. 1) is associated with one of the port circuits. Additionally, any number of port circuits may be included within a PSE device, depending on the implementation. In this particular example, the PSE control circuit 112 includes four network ports and a corresponding number of port circuits 212, 214, 216, and 218.

In operation, when connected directly to host system 101 or configured in an automatic mode, PSE control circuit 112 provides the supply circuitry and power measurement circuitry to support four PSE ports. The on-chip current sense circuitry 254, gate control, current limit, and foldback 250 and channel mode and limit control 242 provide programmable scaling of current limits to match either POE Standard (350 mA, 15.4 W), POE+ Standard (600 mA, 30 W), extended (800 mA, 40 W), and legacy PDs (including customizable current and power limits) on a per network port basis. PSE circuit 112 may be used in endpoint PSE devices (such as Ethernet switches) or midspan PSE applications (such as inline power injectors).

PSE control circuit 112 is configured to provide POE Standard PD detection, classification, and disconnect functionality. Further, PSE control circuit 112 is configurable to detect and support legacy PDs, such as legacy PDs that provide a complex impedance in response to an applied PD detection signal.

As mentioned above, PSE control circuit 112 uses HV SPI and port control 210, MUX 220, and port circuits 212, 214, 216, and 218 to provide per-port device signature detection, which is used to detect POE Standard-compliant PDs as well as legacy PDs. In particular, by applying a PD detection signal, such as the signal 402 depicted in FIG. 4, PSE control circuit 112 yields robust recognition of POE Standard and legacy PD signatures, properly identifying signatures that are often mischaracterized by other detection techniques.

In an example, detection and classification circuit 244 of port circuit 212 applies a PD detection voltage signal to the VOUT 1 pin and samples the resulting line current using current sense circuitry 254. As previously discussed, the PD detection cycle or process implemented by detection and classification circuit 244 includes setting a current limit to 3 mA and applying a negative 4V signal, changing the applied voltage to negative 8V after a period of time, and then, after another period of time, increasing the applied voltage to negative 4V. Current sense circuitry 254 measures the line current after an appropriate settling time, such as about 2 ms after the transition and again 15 ms after the transition to determine a time constant and a steady state current associated with the network port. As previously mentioned, a POE Standard PD may have a small capacitance, which would be fully charged and which would allow the current to settle at a steady state within 2 mS after the transition. Accordingly, such a delay before sampling allows the device to readily distinguish between POE Standard PDs and legacy PDs.

The illustrated embodiment of PSE circuit 112 in FIG. 2 depicts an integrated circuit having multiple pins for communicating with other circuits, including host system 101 and including various PDs, such as POE Standard-compatible and legacy PDs. An example of a legacy PD that includes a complex impedance is depicted below in FIG. 3, which legacy PD can be detected using detection and classification circuitry 244 of PSE circuit 112.

Figure 3:
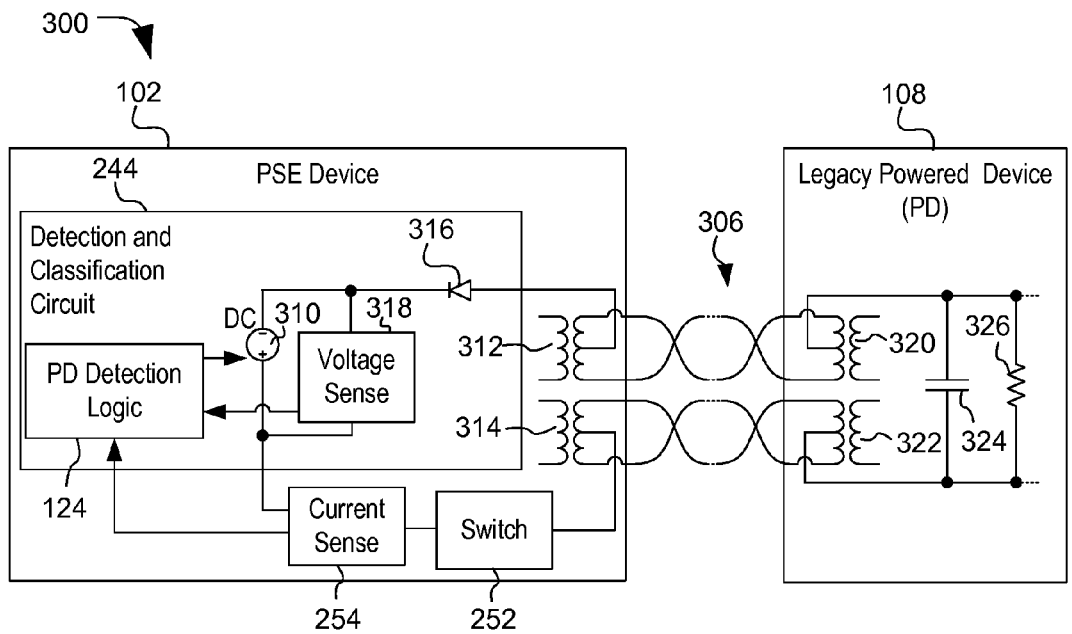
FIG. 3 is a partial block diagram and partial circuit diagram of a POE system including a PSE device with legacy PD detection logic connected to a legacy PD having a resistive-capacitive device signature.

FIG. 3 is a partial block diagram and partial circuit diagram of a POE system 300 including a PSE device 102 with PD detection logic 124 connected to a legacy PD 108 having a resistive-capacitive device signature. PSE device 102 includes detection and classification circuitry 244, current sense circuitry 254 and switch 252. Additionally, PSE device 102 includes transformer windings 312 and 314, which are used by detection and classification circuit 244 to inject a voltage onto twisted pair cabling 306 to supply power to legacy PD 108.

Detection and classification circuit 244 includes PD detection logic 124, which is connected to current sense circuitry 254 and to a voltage generator 310 (which is depicted as a DC supply voltage). PD detection logic 124 controls voltage generator 310 to adjust a voltage applied to center taps on the network cable-side of the transformer windings 312 and 314. Voltage generator 310 includes a positive supply terminal connected to a center tap of transformer 314 through current sense circuitry 254 and switch 252 and includes a negative supply terminal connected to a cathode terminal of a diode 316, which has an anode terminal connected to a center tap of transformer 312. Detection and classification circuit 244 further includes voltage sense circuitry 318 connected between the cathode terminal of diode 316 and a positive supply terminal of voltage generator 310. Voltage sense circuitry 318 is also connected to PD detection logic 124 to provide voltage measurement data.

Legacy PD 108 includes transformers 320 and 322 connected to twisted pair cabling 306. Legacy PD 108 further includes a capacitor 324 and a resistor 326 connected in parallel between terminals connected to center taps on a network cable-side of transformers 320 and 322. Legacy PD 108 may also include a diode bridge (not shown) connected between the center taps and the terminals and configured to provide the same output voltage polarity for positive or negative polarity of the voltage received from network cabling 306.

Legacy PD 108 represents one possible example out of many examples of PDs that do not provide the POE Standard signature (namely a resistance in a range of approximately 19 kΩ to 26 kΩ) in response to an applied PD detection voltage in a range of 2.8V to 10V with a current of up to approximately 5 mA. In the illustrated example, the capacitor 324 and resistor 326 are arranged in parallel and cooperate to provide a resistive-capacitive device signature (i.e., a complex impedance), which is detectable by PD detection logic 124. It should be understood that capacitor 324 is larger than the 0.1 μF capacitance that is permitted under either the POE Standard or the POE+ Standard.

In operation, PD detection logic 124 controls voltage generator 310 to apply a PD detection voltage signal to twisted pair cabling 306 to detect legacy PD 108. In particular, PD detection logic 124 controls voltage generator 310 to provide a negative four volt (−4V) signal for a first period of time, a negative eight volt (−8V) signal for a second period of time, and a negative four volt (−4V) signal for a third period of time. After each transition, PD detection logic 124 waits for a period of time corresponding to a settling period and then samples the current from current sense circuitry 254. In some instances, PD detection logic 124 may sample the current multiple times to determine a time constant and a steady state current associated with the device connected to the network port. PD detection logic 124 may also sample the port voltage using voltage sense circuitry 318. PD detection logic 124 detects legacy PD 108 based on the resistive-capacitive (RC) response (i.e., the complex impedance) determined from the sampled current and optionally the sampled port voltage.

As discussed above, PD detection logic 124 controls voltage generator 310 to apply the PD detection voltage signal to the port as part of the POE Standard PD detection process to detect a PD or a legacy PD. An example of the PD detection voltage signal is depicted below in FIG. 4.

Figure 4:
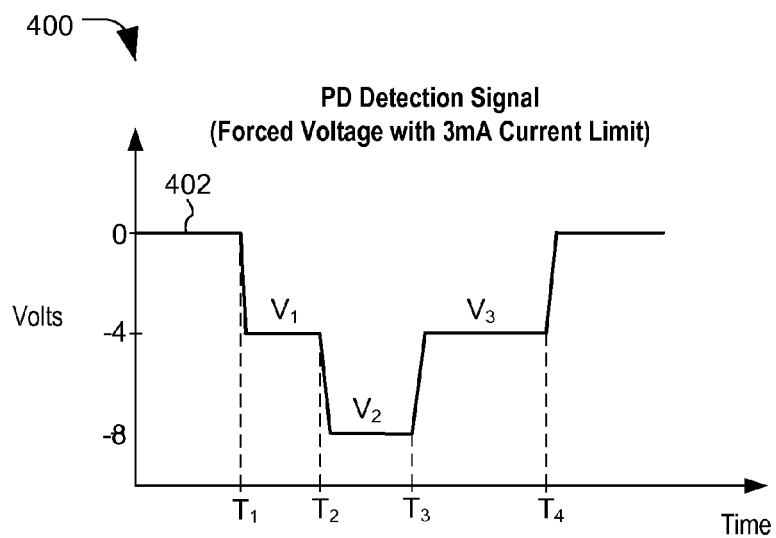
FIG. 4 is a graph of a PD detection voltage signal, including first, second, and third voltage levels, applied by an embodiment of a PSE device, such as the PSE device of FIG. 1, as part of a PD detection process.

FIG. 4 is a graph 400 of a PD detection voltage signal 402, including first, second, and third voltage levels ($V_1$, $V_2$, and $V_3$), applied by PSE device 102 as part of a PD detection process. PSE device 102 is configured to supply a negative voltage to PDs, though, in the alternative, a positive detection voltage could be used.

In particular, PD detection voltage signal 402 includes first voltage level ($V_1$) of approximately negative four volts, followed by second and third voltage levels ($V_2$ and $V_3$) of negative eight volts and negative four volts. PSE control circuitry 112 applies the PD detection voltage signal 402 and monitors the line current drawn by a device connected to the selected network port. If no current is drawn, an open circuit condition is detected. If current is drawn and then turns off, a purely capacitive load is detected. If the line current varies in response to the changes in the voltage level of the PD detection voltage signal 402, a legacy PD or a POE Standard-compliant PD may be detected.

A representative example of a port voltage and current response of a POE Standard-compatible PD in response to the PD detection voltage signal 402 from detection and classification circuit 244 is illustrated below in FIG. 5.

Figure 5:
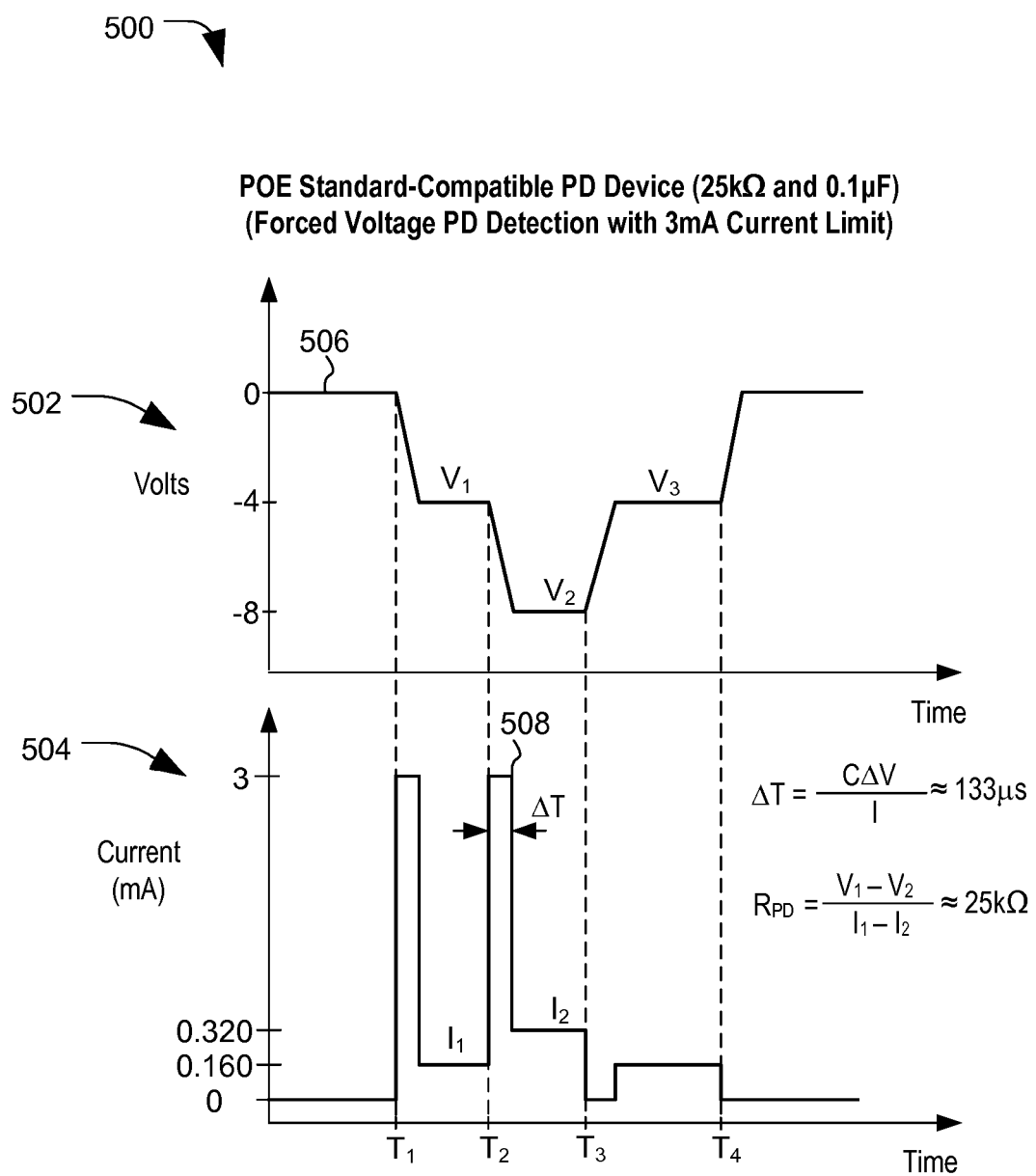
FIG. 5 is a graph of voltage versus time and current versus time depicting voltage and current responses for a POE Standard-compliant PD in response to a PD detection voltage signal with a 3 mA current limit.

FIG. 5 is a graph 500 of voltage versus time 502 and current versus time 504 depicting voltage and current responses for a POE Standard-compliant PD in response to a PD detection voltage signal with a 3 mA current limit. In particular, graph 500 represents the current and port voltage response of PD having a 25 kΩ resistance and a capacitance of 0.1 μF to a forced voltage PD detection signal.

In the illustrated embodiment, when the PD detection voltage signal transitions from zero volts to negative four volts at a first time ($T_1$), the port voltage (indicated by reference number 506) transitions to a first voltage level ($V_1$). Further, the line current (indicated by reference number 508) transitions to the current limit of 3 mA for a brief period after which it decreases to a first current level ($I_1$). The brief period of maximum current draw represents a time period during which the 0.1 μF capacitor is charging. In particular, the time period is a function of the size of the voltage change (4V), the size of the capacitance (0.1 μF), and the maximum current (I=3 mA) according to equation 2 below.

$$\Delta T = \frac{C \Delta V}{I} = \frac{0.1 \mu F * 4 \text{ V}}{3 \text{ mA}} = 133 \ \mu s \quad (2)$$

After the period of time, the current decreases to a level that corresponds to the PD detection voltage signal divided by the resistance according to equation 3 below.

$$I_1 = \frac{V_1}{R} \quad (3)$$

When the PD detection voltage signal transitions again from negative four volts to negative eight volts at a second time ($T_2$), port voltage 506 transitions to a second voltage level ($V_2$). Further, line current 508 transitions from the first current level ($I_1$) to the current limit of 3 mA for a brief period after which it decreases to a second current level ($I_2$). Once again, the brief period of maximum current draw represents a time period during which the 0.1 μF capacitor is again charging. After the capacitor is charged, the current again decreases to a current level that corresponds to the PD detection voltage signal divided by the resistance.

When the PD detection voltage signal transitions from negative eight volts to negative four volts at a third time ($T_3$), the port voltage 506 increases to a third voltage level ($V_3$). However, line current 508 decreases to a level that is below the first current level ($I_1$) for a brief period. During this period, the capacitor discharges through the resistor, so the current is supplied by the capacitor and not the PSE device 102. Once the stored charge of the capacitor is discharged to the negative four volt level of the PD detection voltage signal, the line current increases to the first current level ($I_1$). When the PD detection voltage signal transitions to zero volts, the line current decreases to 0 mA, and, in theory, the capacitor discharges through the resistor. However, in some instances, control circuitry of the PD may disconnect the capacitor from the resistor.

When a forced voltage is applied to a purely capacitive device connected to the network port, PD detection circuitry 124 detects a different response in terms of the port voltage and the line current. A representative example of such a purely capacitive device is depicted below in FIG. 6.

Figure 6:
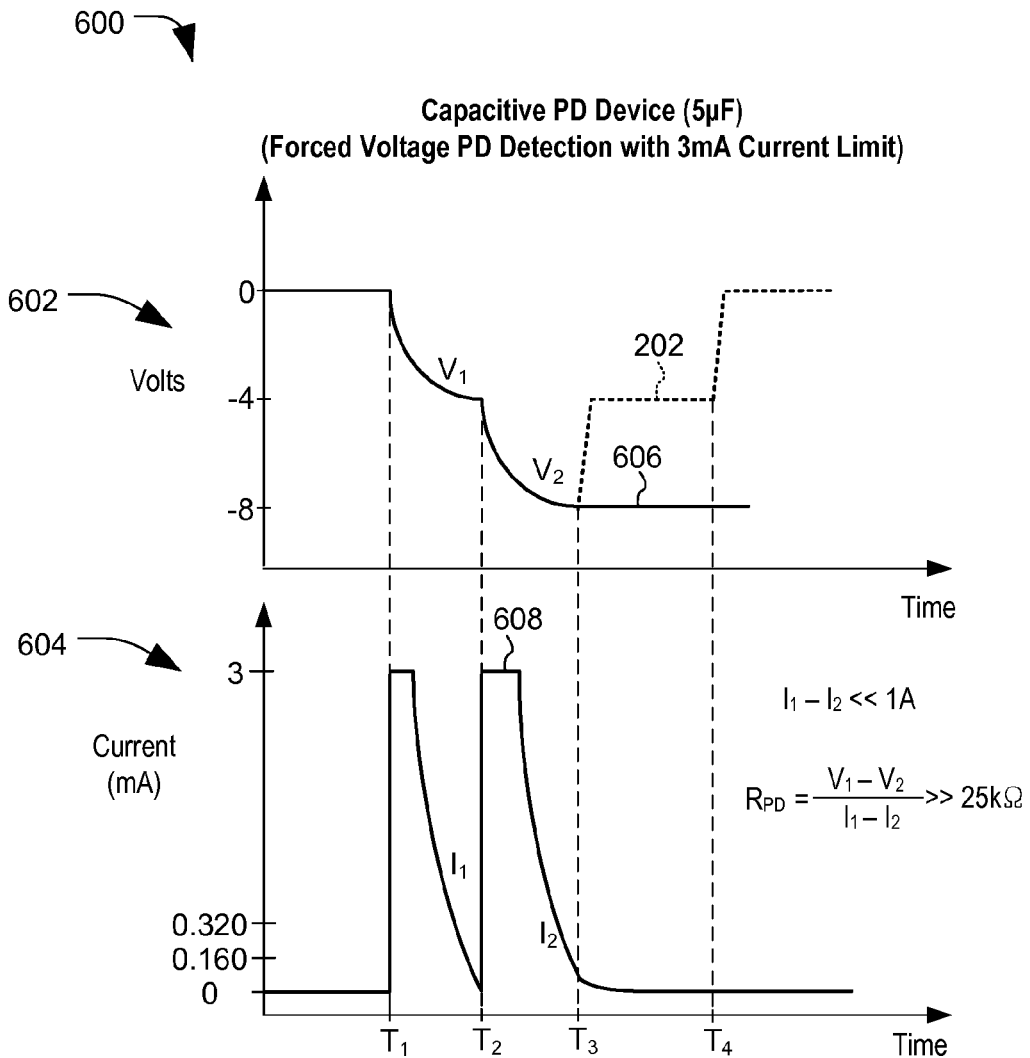
FIG. 6 is a graph of voltage versus time and current versus time depicting voltage and current responses for a capacitive PD, including a 5 µF capacitor, in response to a PD detection voltage signal with a 3 mA current limit.

FIG. 6 is a graph 600 of voltage versus time 602 and current versus time 604 depicting voltage and current responses for a capacitive PD, including a 5 μF capacitor, in response to a PD detection voltage signal with a 3 mA current limit. In the illustrated embodiment, port voltage 606 changes with the first and second voltage levels of the PD detection voltage signal. With the first transition at time ($T_1$), the line current increases to approximately the current limit and then falls to approximately 0 mA as the capacitor charges. Thus, the steady state current reflects a 0 mA current, once the capacitor is fully charged. Both the port voltage 606 and the line current 608 reflect a capacitive time constant.

When the PD detection voltage signal changes again at time ($T_2$), the port voltage decreases to a second voltage level ($V_2$) over time as the capacitor charges. Similarly, the line current increases to the current limit for a period of time and then decays as the capacitor charges. When the PD detection voltage signal transitions at time ($T_3$), the port voltage does not change because the capacitor is fully charged and has no discharge path. Further, the line current falls to approximately 0 mA. Since the line current and the voltage don't change as the PD detection voltage signal returns to zero, PD detection circuit 124 detects the purely capacitive load.

While the example in FIG. 6 depicts a purely capacitive device, some legacy PDs may have both a resistor and a capacitor in parallel. One example of the port voltage and line current response of a representative example of such a legacy PD is described below with respect to FIG. 7.

Figure 7:
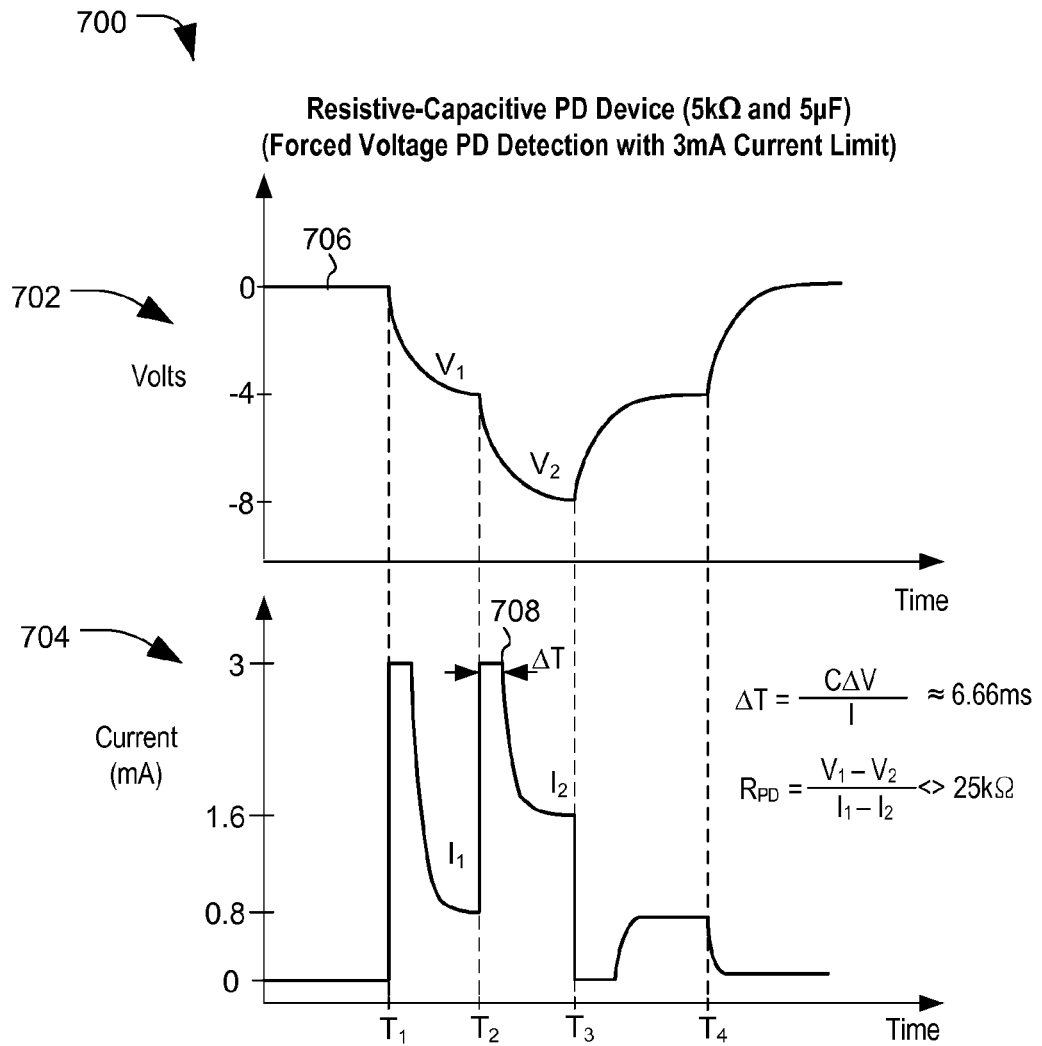
FIG. 7 is a graph of voltage versus time and current versus time depicting voltage and current responses for a resistive-capacitive PD, including a 5 k$\Omega$ resistor and a 5 µF capacitor, in response to a PD detection voltage signal with a 3 mA current limit.

FIG. 7 is a graph 700 of voltage versus time 702 and current versus time 704 depicting voltage and current responses for a resistive-capacitive PD (such as legacy PD 108 depicted in FIGS. 1 and 3), including a 5 kΩ resistor and a 5 μF capacitor, in response to a PD detection voltage signal with a 3 mA current limit. As compared to a PD that complies with the POE Standard, the legacy PD has a lower resistance and a larger capacitance.

When the PD detection voltage signal transitions at time ($T_1$) from zero volts to negative four volts, the port voltage 706 decreases to a first voltage level ($V_1$). Additionally, the line current 708 increases to the maximum current of 3 mA for a period of time ($\Delta T$) and then falls to a first current level ($I_1$). The period of time ($\Delta T$) corresponds to a time needed to charge the capacitor and can be determined according to equation 4 below:

$$\Delta T = \frac{C \Delta V}{I} = \frac{5 \mu F * 4 \text{ V}}{3 \text{ mA}} = 6.66 \text{ ms} \quad (4)$$

The time period before the current falls to the first current level ($I_1$) (i.e, a first steady state current) is short enough to fall within the settle time required by the POE Standard, which defined settle time is approximately 10 ms. The first steady state current represents the current attributable solely to the voltage applied to the resistance in parallel with the capacitor.

When the PD detection voltage signal transitions again at time ($T_2$), the port voltage 706 decreases over time to a second voltage level ($V_2$) and the line current 708 again increases to the current limit of 3 mA for the period of time ($\Delta T$) before decreasing to a second current level ($I_2$), i.e., to the second steady state current.

When the PD detection voltage signal transitions at time ($T_3$) from negative eight volts to negative four volts, the port voltage 706 increases over time. However, the line current 708 decreases to approximately zero for the period of time ($\Delta T$), discharging the capacitor through the resistor. Once the capacitor is discharged to the negative four volt level, the current increases to the first current level ($I_1$). At time ($T_4$), the PD detection voltage signal increases to zero volts, and the port voltage 706 and the line current 706 both fall to zero, as the capacitor discharges through the resistor.

The first and second current levels ($I_1$ and $I_2$) represent a steady state current produced by applying a voltage level to a fixed resistance, which does not necessarily match the resistive range specified by the POE Standard. Nevertheless, PD detection logic 124 determines the resistive-capacitive (RC) characteristic based on variations in the line current determined through multiple samples to detect the legacy PD.

With respect to the example depicted in FIG. 7, testing of multiple legacy PDs having RC characteristics reveal that none of the devices produce a short circuit or open circuit signature. Further, each of the tested devices settled to approximately 4V after the first transition at time (T1) and a settling period. Further, each of the tested devices showed a slower increase in voltage in the 4V to 8V step than a POE Standard-compliant PD due to the 3 mA detection current limit and the input capacitance of the legacy PD. Further, each of the tested devices showed a fairly large increase in voltage at the 8V step.

Figure 8:
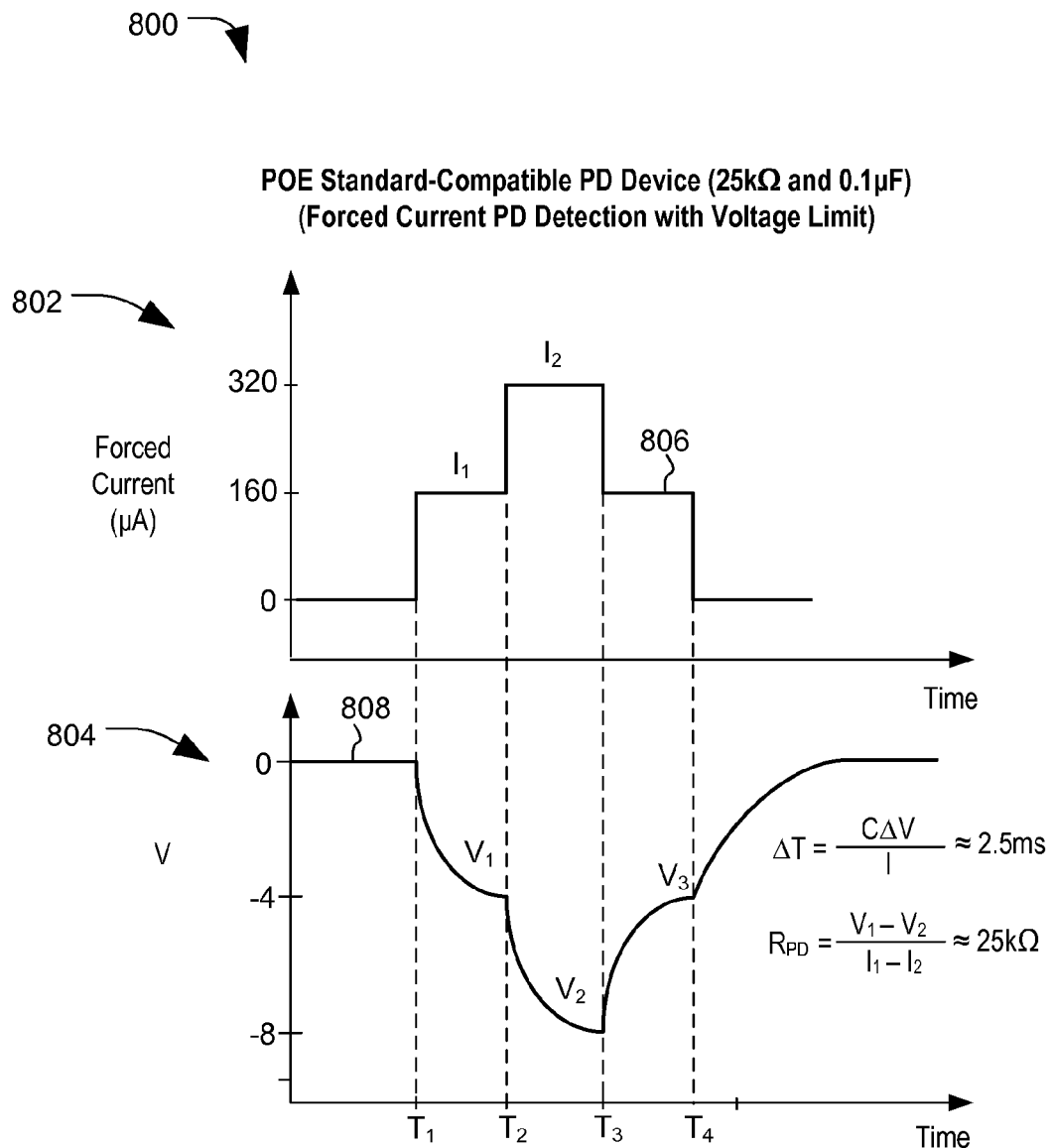
FIG. 8 is a graph of current versus time and voltage versus time depicting voltage and current responses for a POE Standard-compliant PD in response to a forced current PD detection signal with a limited voltage.
Figure 9:
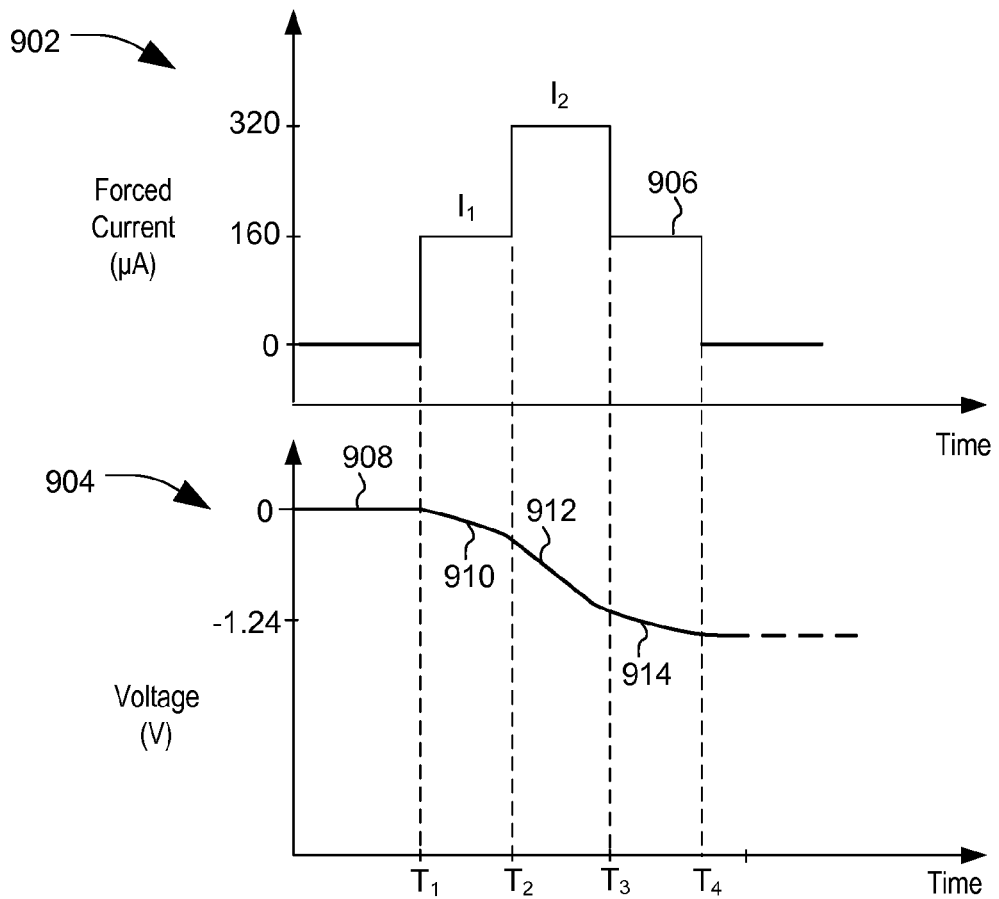
FIG. 9 is a graph of current versus time and voltage versus time depicting voltage and current responses for a capacitive PD, including a 5 µF capacitor, in response to a forced current PD detection signal with a limited voltage.
Figure 10:
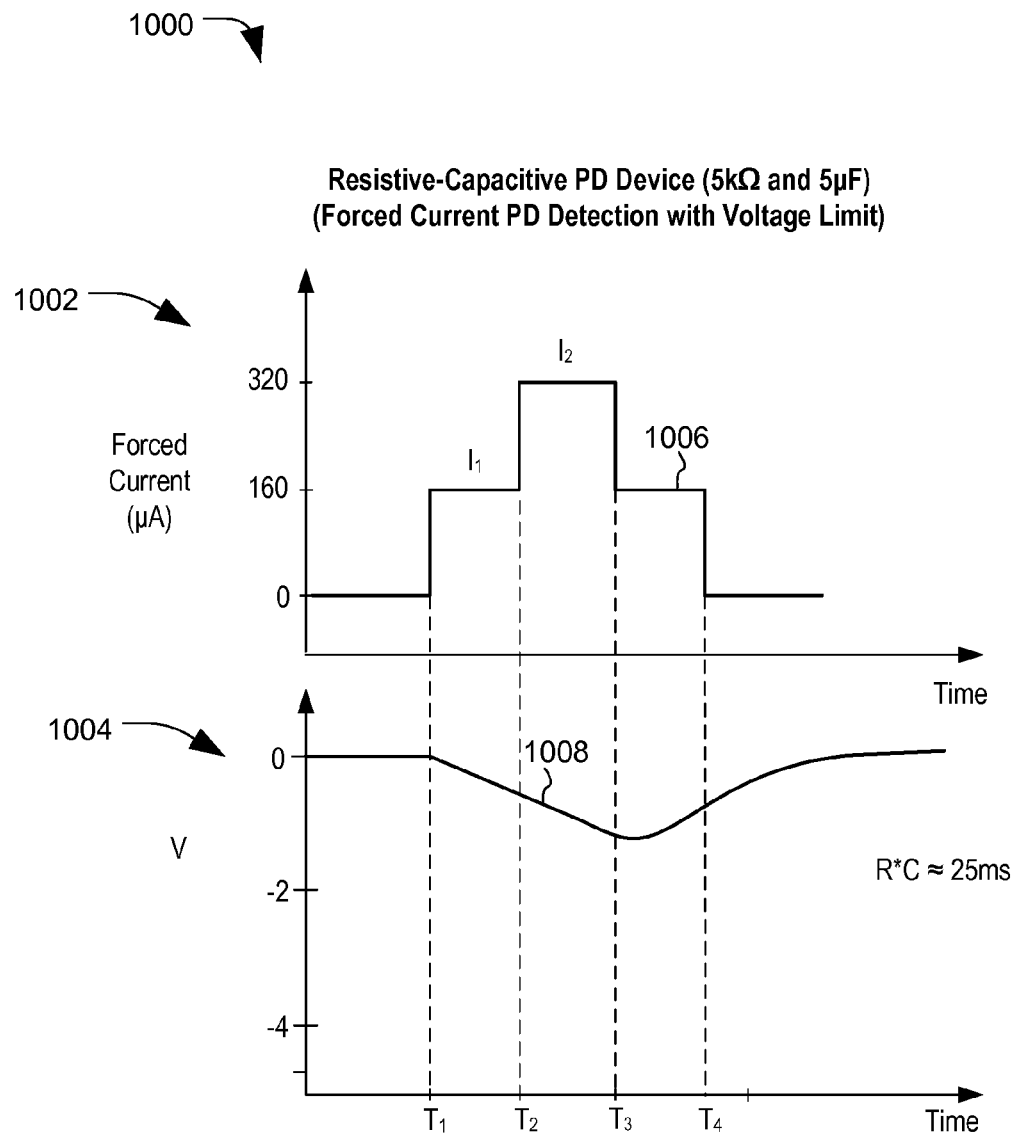
FIG. 10 is a graph of current versus time and voltage versus time depicting voltage and current responses for a resistive-capacitive PD, including a 5 k$\Omega$ resistor and a 5 µF capacitor, in response to a forced current PD detection signal with a limited voltage.

While the examples depicted in FIGS. 5-7 illustrate the port voltages and line currents when a forced voltage PD detection signal with a limited current is applied to various devices. FIGS. 8-10 depict the port voltages and line currents when a forced current PD detection signal with a limited voltage is applied to the same devices.

FIG. 8 is a graph 800 of current versus time 802 and voltage versus time 804 depicting voltage and current responses for a POE Standard-compliant PD (25 kΩ and 0.1 μF) in response to a forced current PD detection signal with a limited voltage. Current versus time graph 802 depicts a forced line current 806, which transitions from 0 mA to 160 mA at a first time ($T_1$), transitions from 160 μA to 320 μA at a second time ($T_2$), from 320 mA to 160 mA at a third time ($T_3$), and from 160 μA to 0 μA at a fourth time ($T_4$).

After the first transition at first time ($T_1$), port voltage 808 changes over time to a first voltage level ($V_1$). The line capacitance and the 0.1 μF capacitance of the PD produce the RC time constant evident in the port voltage 808. After the second time ($T_2$), the port voltage 808 decreases to a second voltage level ($V_2$) over time. After the third time ($T_3$), port voltage 808 increases over time to a third voltage level ($V_3$). After the fourth time ($T_4$), port voltage 808 increases over time to approximately zero volts.

As shown the settle time of the PD to reach the steady state is approximately 2.5 ms and the calculated resistance is approximately 25 kΩ. Both of these values indicate a POE Standard-compatible PD device that complies with the PD detection requirements. However, the settling time is significantly longer than that needed for the forced voltage/current limited implementation. Further, the forced line current PD detection approach produces significantly different responses when applied to a purely capacitive device, as discussed below with respect to FIG. 9.

FIG. 9 is a graph 900 of current versus time 902 and voltage versus time 904 depicting voltage and current responses for a capacitive PD, including a 5 μF capacitor, in response to a forced current PD detection signal with a limited voltage. In this example, when the forced current transitions at time ($T_1$), the line current 906 tracks the forced current PD detection signal. Port voltage 908 decreases slowly. In particular, the port voltage 908 may decrease over a series of PD detection cycles until the voltage limit is reached.

In the illustrated port voltage graph 904, between first and second transition times ($T_1$ and $T_2$), port voltage 908 decreases at a first rate (indicated by the slope of the line at 910). Between second and third transition times ($T_2$ and $T_3$), port voltage 908 decreases at a second rate (indicated by the slope of the line at 912). Further, between third and fourth transition times ($T_3$ and $T_4$), port voltage 908 decreases at a third rate (indicated by the slope of the line at 914). After the fourth transition time ($T_4$), the port voltage remains unchanged, at least until another PD detection process is executed.

In this example, the first rate indicated at 910 is approximately 0.032V per millisecond. The second rate indicated at 912 is approximately 0.060V per millisecond. The third rate indicated at 914 is approximately 0.032V per millisecond. After this cycle of the PD detection process is completed, the port voltage stabilizes at approximately −1.24V. Thus, the changing forced current alters the rate at which the capacitor charges. However, the low current in the microampere range causes the voltage to increase so slowly that the purely capacitive device does not reach a steady state.

Unlike a purely capacitive device, as discussed above, some legacy PDs include a capacitor and a resistor in parallel. However, application of a forced current to such legacy PDs produces a significantly different device signature as compared to the same device's response to a forced voltage (as illustrated in FIG. 7). An example of the forced current response is described below with respect to FIG. 10.

FIG. 10 is a graph 1000 of current versus time 1002 and voltage versus time 1004 depicting voltage and current responses for a resistive-capacitive PD, including a 5 kΩ resistor and a 5 μF capacitor, in response to a forced current PD detection signal with a limited voltage. Once again, the line current 1006 tracks the forced current PD detection signal. However, the port voltage 1008 produces a shallow v-shaped signature. In this instance, the port voltage 1008 decreases when the first and second current levels ($I_1$ and $I_2$) are applied. When the line current decreases at the third time ($T_3$), the port voltage 1008 increases slowly as the capacitor discharges through the resistor.

In the illustrated embodiment, the capacitor charges to less than a negative two volts before increasing to zero voltage. Further, the RC time constant is 25 ms, so the circuit does not settle in a typical 10 ms time period. The low voltage and the slow charge and discharge can be difficult to distinguish a legacy PD from a device that is not equipped to receive power from the network cable. In particular, the legacy PD may not provide a steady state that can be determined through the forced current approach.

Thus, the forced voltage PD detection signal provides a superior signal for detecting legacy PDs that have both capacitive and resistive elements in parallel. As illustrated and described above with respect to FIGS. 1-3, PD detection circuit 124 is configured to apply a forced voltage PD detection signal to a network port and to monitor a line current to detect PDs, legacy PDs, other devices, and available ports. PD detection circuit 124 is configured to relay status information to a control circuit and/or to a host controller, such as host system 101, which can determine whether to apply power to the port, based on the status information.

Figure 11:
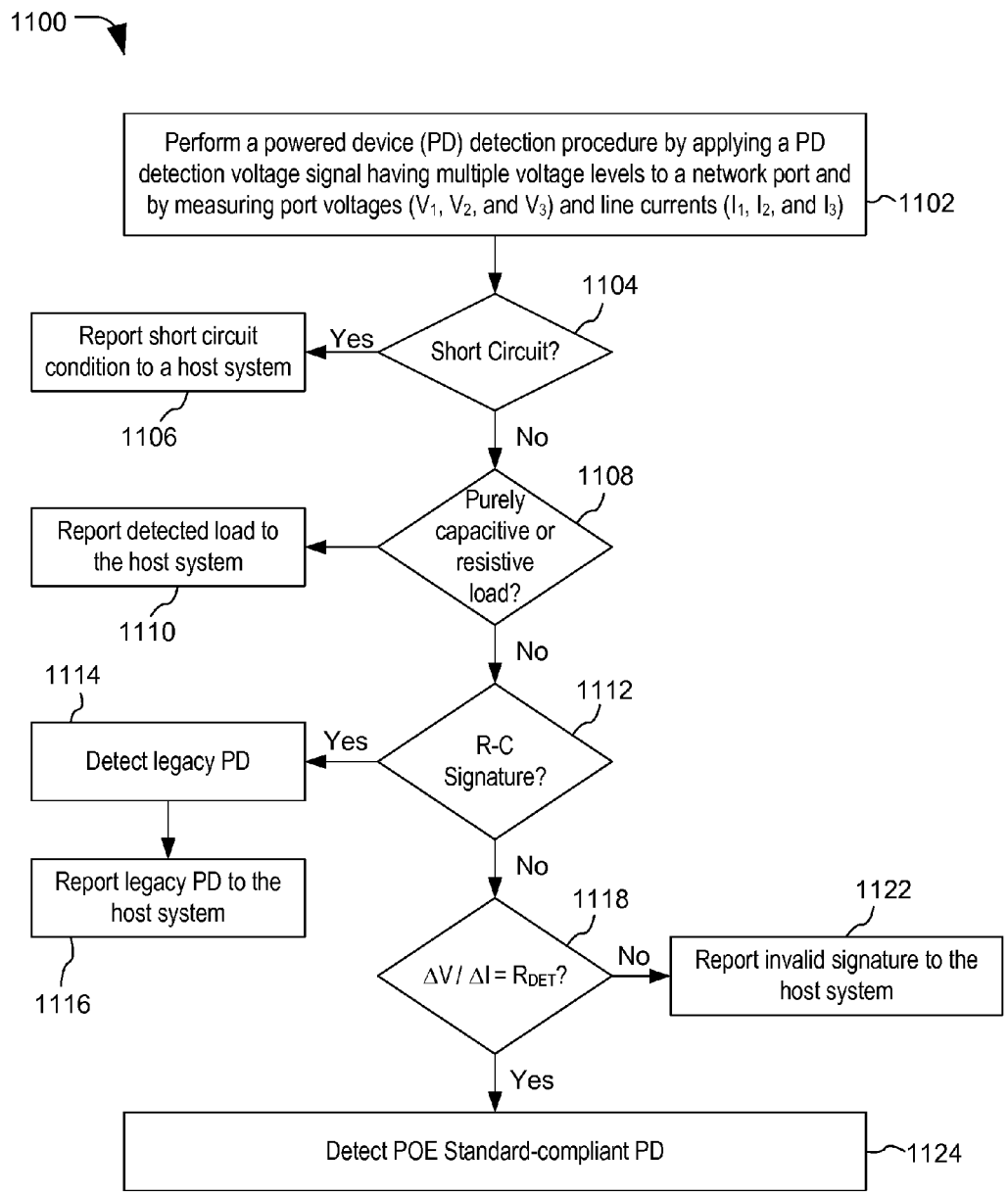
FIG. 11 is a flow diagram of an embodiment of a method for detecting a legacy PD in a POE system.

FIG. 11 is a flow diagram of an embodiment of a method 1100 for detecting a legacy PD in a POE system. At 1102, a powered device (PD) detection procedure is performed by applying a PD detection voltage signal having multiple voltage levels to a network port and by measuring port voltages ($V_1$, $V_2$, and $V_3$) and line currents ($I_1$, $I_2$, and $I_3$). The port voltages may be sampled before and after transitions in the PD detection voltage signal. Additionally, the line currents may be sampled multiple times to detect a time constant and a steady state current in response to the PD detection voltage signal. In an embodiment, the current associated with the PD detection voltage signal is also limited to a current level that is less than 5 mA. In a particular example, the current is limited at approximately 3 mA.

Advancing to 1104, if PD detection circuit 124 determines that measurements associated with the network port represent a short circuit condition, the method 1100 advances to 1106 and the short circuit condition is reported to a host system (or a control circuit). In some instances, a short circuit condition indicates that no device is connected to the network port. In other instances, the short circuit condition indicates a device that is not configured to receive power from a network cable.

If, at 1104, PD detection circuit determines that there is no short circuit condition, the method 1100 advances to 1108 and PD detection circuit 124 determines if the measurements associated with the network port represent a purely capacitive or purely resistive load. At 1108, if the purely capacitive or purely resistive load is detected, the method 1100 advances to 1110 and PD detection circuit reports the purely resistive or purely capacitive load to the host system (or the control circuit). Otherwise, the method proceeds to 1112.

At 1112, if the measurements associated with the network port represent a resistive-capacitive (RC) signature (i.e., a complex impedance), the method advances to 1114 and a legacy PD is detected. Moving to 1116, the legacy PD is reported to the host system (or the control circuit).

Returning to 1112, if the measurements associated with the network port do not represent an RC signature, the method 1100 continues to 1118. At 1118, if the change in voltage divided by the change in current produces a resistance value within a range of approximately 19 kΩ to 26 kΩ, the method 1100 proceeds to 1120 and a POE Standard-compliant PD is detected. Otherwise, the method 1100 advances to 1122, PD detection logic 124 reports an invalid signature to the host system (or the control circuit), for example, by setting an appropriate status bit in registers 126.

The host system or control circuit may control the PSE device 102 to provide power to the network port based on the detected device. In one example, PSE device 102 may be configured to automatically supply power to a POE standard-compliant PD device and to only supply power to other devices reported to the host system based on control signals from the host system. In other embodiments, power may be supplied automatically to PDs and legacy PDs, but not to purely capacitive or purely resistive devices. In still other embodiments, power may be provided only upon authorization from the host system, and all detection results are reported to the host system.

Figure 12:
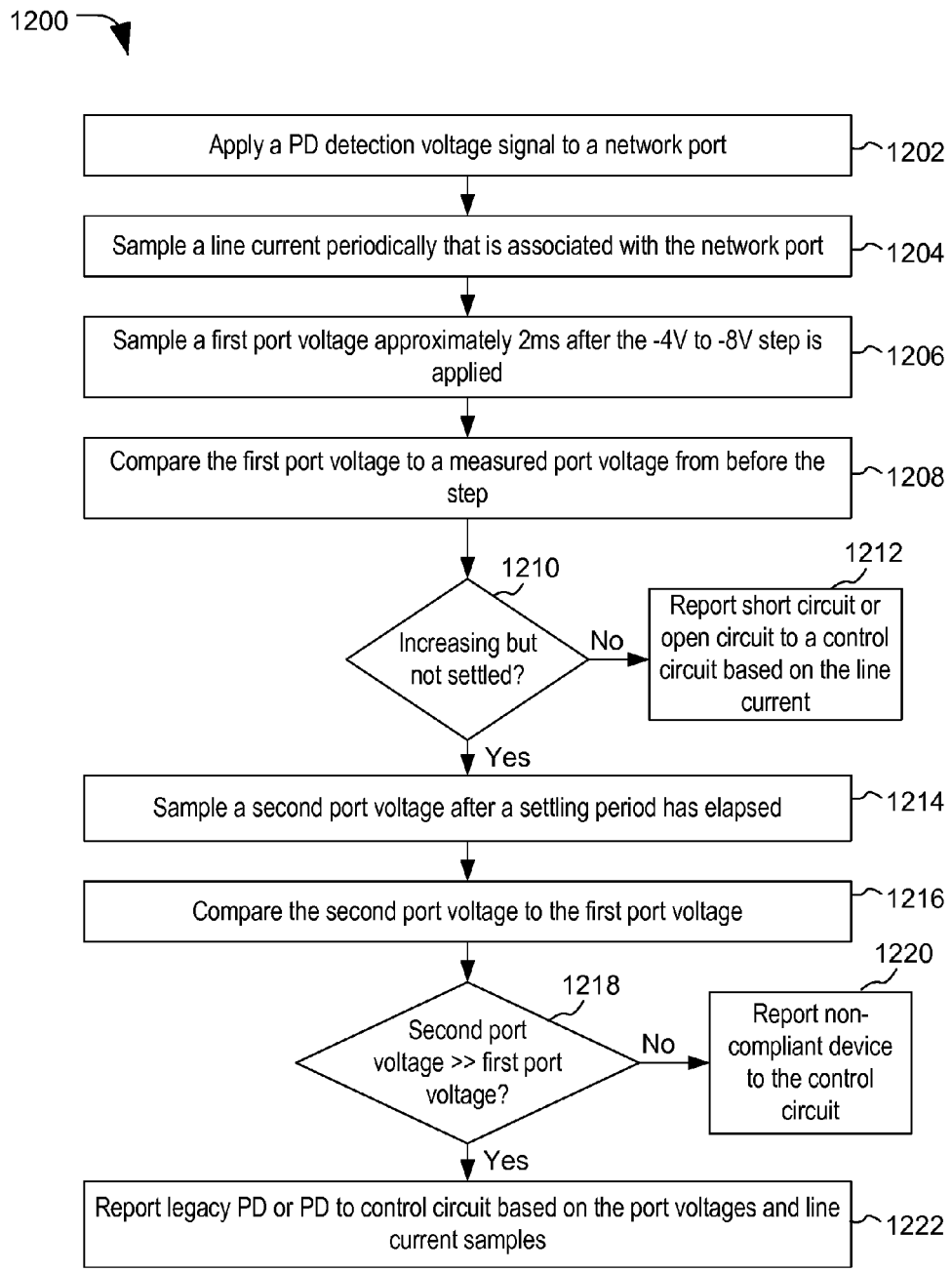
FIG. 12 is a flow diagram of another embodiment of a method for detecting a legacy PD in a POE system.

FIG. 12 is a flow diagram of another embodiment of a method 1200 of detecting a legacy PD. At 1202, PD detection logic 124 applies a PD detection voltage signal to a network port. Advancing to 1204, PD detection logic 124 periodically samples a line current associated with the network port. Proceeding to 1206, PSE detection logic 124 samples a first port voltage approximately 2 ms after the −4V to −8V step of the PD detection voltage signal is applied. Moving to 1208, the first port voltage is compared to a measured port voltage from before the voltage step.

At 1210, if the comparison indicates that the port voltage is not increasing or has settled, the method 1200 advances to 1212 and PD detection logic 124 reports a short circuit or open circuit to a control circuit based on the line current. In other words, PD detection logic 124 determines whether it is a short circuit or an open circuit based on the line current and reports the status to the control circuit.

Otherwise, at 1210, if the comparison indicates that the port voltage is increasing but has not settled, the method continues to 1214 and a second port voltage is sampled after a settling period has elapsed. In some instances, the settling period can be as much as 15 ms after the −4V step is applied.

At 1216, PD detection logic 124 compares the second port voltage to the first port voltage. At 1218, if the second port voltage is not substantially greater than the first port voltage, the method 1200 advances to 1220 and PD detection logic 124 reports a non-compliant device to the control circuit. Such a non-compliant device may be a device that is not configured to receive power through the network cable. Otherwise, at 1218 if the second port voltage is substantially greater than the first port voltage, the method proceeds to 1222 and PD detection logic 124 reports a legacy PD or a POE Standard-compliant PD based on the port voltages and the line current samples.

In one particular embodiment, PD detection logic 124 stores legacy PD thresholds within registers 126. In a particular example, the values are stored in registers 0x52 to 0x55. PD detection logic multiplies the stored values by 20 to produce pass-fail limits in millivolts. The voltage increase from just before the −4V to −8V step to 2 ms after the step should be between the value of register 0x52×20 mV and the value of register 0x53×20 mV. Further, the voltage step from the 2 ms sample to the sample taken after the settling period should be between the value of register 0x54×20 mV and the value of register 0x55×20 mV. In this example, the values stored in registers 0x52 to 0x55 are factory-configured. Registers 0x52 to 0x55 are read/write registers and can be adjusted if desired. For example, the values stored in the registers may be adjusted based on experience with other legacy PDs or if only certain model numbers of Legacy PDs are to be accepted. In an alternative example, the values may be derived from samples of known legacy devices.

An Ethernet device that is not a valid PD or a legacy PD will give a detection result indicating a short circuit (such as if a 75Ω termination resistor to a common time point is present) or an open circuit (such as if no device is connected to the network port). Thus, PD detection circuit 124 generates a detection complete interrupt only if the detection result is not a short circuit or open circuit. If a port has already been enabled for powering legacy PDs, PD detection circuit enables interrupts for detection complete, and a control circuit or host system 101 evaluates the results and makes a decision whether or not to power the port.

While the above example in FIG. 12 describes a port voltage measurement-based detection, it should be understood that the legacy PD may be detected based on the PD detection voltage signal and the samples of the line current. In particular, line current measurements before and after each transition and again before a subsequent transition of the PD detection voltage signal can be exampled to determine a time constant and a steady state current, indicating a resistance and capacitance in parallel, which may indicate the presence of a legacy PD.

In conjunction with the circuits, PSE devices, and methods disclosed above with respect to FIGS. 1-12, a PD detection circuit applies a PD detection voltage signal (such as a forced voltage signal with a limited current) to a network port and measures both port voltages and line currents for the network port to detect an RC characteristic indicating a legacy PD. Upon detection of a legacy PD, PD detection logic communicates a status indicator to a control circuit indicating a legacy PD is connected to the network port. The status indicator can include status bits set in a register or can be a signal communicated to a control circuit, which is either on-chip or connected to the PD detection logic through a serial interface.

Although the present invention has been described with reference to preferred embodiments, workers skilled in the art will recognize that changes may be made in form and detail without departing from the scope of the invention.

What is claimed is:

1. A power source equipment (PSE) device comprising:
a network port configurable to couple to a network cable; and
a detection circuit coupled to the network port and configured to apply a powered device (PD) detection voltage signal including first and second voltages to the network port, the detection circuit to sample a line current of the network port in response to the first and second voltages to detect a complex impedance indicating that a legacy PD is coupled to the network port.

2. The PSE device of claim 1, further comprising:
a register configured to store one or more status bits to indicate that the legacy PD is coupled to the network port based on the complex impedance.

3. The PSE device of claim 2, further comprising:
a control circuit coupled to the register and configured to control delivery of power to the legacy PD through the network port based on the one or more status bits.

4. The PSE device of claim 1, wherein the detection circuit comprises:
a current sense circuit configured to sample the line currents in response to the first and second voltages; and
PD detection logic coupled to the current sense circuit to determine a time constant and at least one steady state current, the PD detection logic configured to determine a resistance based on the first and second voltages and the at least one steady state current.

5. The PSE device of claim 4, wherein the detection circuit detects the legacy PD when the complex impedance indicates a resistance of less than 15 kΩ and a capacitance greater than 0.5 µF.

6. The PSE device of claim 1, wherein the detection circuit comprises:
a voltage generator configured to generate the PD detection voltage signal; and
PD detection logic configured to control the voltage generator to apply the PD detection voltage signal.

7. A system for providing power to a powered device (PD) in a Power over Ethernet (PoE) system, the system comprising:
a plurality of network ports, each of the plurality of network ports configurable to connect to a network cable; and
PD detection circuitry including a plurality of PD detection circuits, each PD detection circuit associated with a network port of the plurality of network ports and configured to apply a PD detection voltage signal to the network port and to sample a line current of the network port in response to the PD detection voltage signal to determine a complex impedance indicating that a legacy PD is coupled to the network port.

8. The system of claim 7, wherein each of the PD detection circuits comprises:
PD detection logic configured to determine a time constant associated with the network port based on differences between samples of the line current after a voltage level of the PD detection voltage signal changes from a first voltage level to a second voltage level.

9. The system of claim 8, wherein each of the PD detection circuits comprises a current sense circuit configured to sample the line current before and approximately 2 ms after the PD detection voltage signal changes.

10. The system of claim 7, wherein the PD detection circuitry comprises:
a plurality of port circuits, each port circuit of the plurality of port circuits coupled to one of the plurality of network ports, each port circuit comprising:
one of the PD detection circuits to detect the complex impedance;
a switch configured to limit current flow to the network port;
a current sense circuit to sample the line current; and
a gate control circuit configured to control the switch based on samples of the line current.

11. The system of claim 7, further comprising:
a serial interface configurable to connect to a host controller for communicating status information indicating detection of the legacy PD to the host controller and for receiving control signals for controlling delivery of a power supply to the network port.

12. The system of claim 7, wherein each of the PD detection circuits is configured to determine a time constant and a steady state current for the network port.

13. The system of claim 12, wherein each of the PD detection circuits determines a resistance associated with the network port by dividing the PD detection voltage signal by the steady state current.

14. The system of claim 7, further comprising:
a controller configurable by the host controller to control the delivery of the power supply to the network port.

15. A method of detecting a legacy powered device (PD), the method comprising:
applying a PD detection voltage signal having a first voltage and a second voltage to a network port of a power source equipment (PSE) device;
measuring line currents of the network port in response to the first and second voltages to detect a complex impedance indicating the legacy PD is coupled to the network port.

16. The method of claim 15, wherein the complex impedance is detected based on changes in the line currents.

17. The method of claim 15, wherein the line currents vary according to the complex impedance to reveal a resistive-capacitive time constant and a steady state current.

18. The method of claim 15, wherein applying the PD detection voltage signal comprises:
providing the first voltage to the network port at a first time;
providing the second voltage to the network port at a second time; and
providing a third voltage to the network port at a third time.

19. The method of claim 18, wherein measuring the line currents comprises:
sampling the line current before and after providing each of the first, second, and third voltages.

20. The method of claim 18, wherein the third voltage is substantially equal to the first voltage.

* * * * *